April 29, 1958     V. E. HAMREN     2,832,217
ANGLE OF ATTACK SENSOR
Filed March 22, 1955
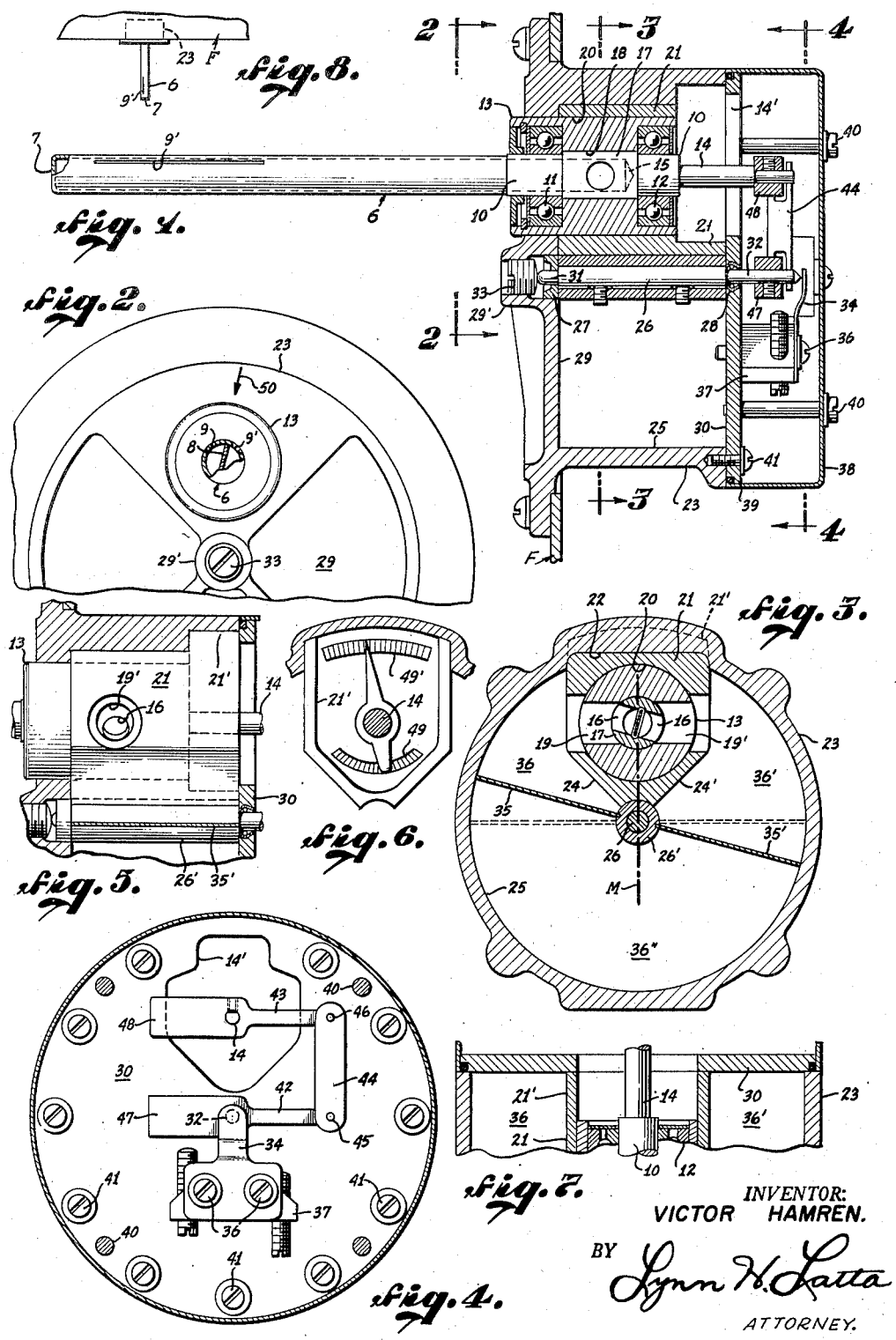
INVENTOR:
VICTOR HAMREN.
BY Lynn H. Latta
ATTORNEY.

United States Patent Office 2,832,217
Patented Apr. 29, 1958

2,832,217

ANGLE OF ATTACK SENSOR

Victor Earle Hamren, Los Angeles, Calif., assignor to Topp Industries Inc., Los Angeles, Calif., a corporation of California Application March 22, 1955, Serial No. 495,966

3 Claims. (Cl. 73—188)

This invention relates to an instrument for sensing deviations in the angle of attack or sideslip of an airplane from any preset zero position and for transmitting a signal (e. g. a change in a ratio of resistances provided by the respective sides of a potentiometer constituting a part of the sensor) that can be utilized to control the operation of an angle of attack indicator or to assist in controlling a rocket or missile platform positioning computer or other instrumentality.

A sensor utilizing a rotating tubular probe, divided into two longitudinal passages for transmitting differential pressures from spaced, parallel, longitudinal slots in the side wall of the probe to pressure differential responsive paddles that are mounted for swinging movement, has heretofore been proposed. The present invention provides improvements in that type of sensor, which effectively overcome a number of objections inherent therein, including: lack of adequate sensitivity; a tendency to be unstable as a result of hunting, with a resultant failure to transmit a dependable signal; and lack of a uniform response ratio as reflected in the ratio of the input voltage fed to a computer circuit by the sensor and the output voltage developed by said circuit.

The general object of this invention is to overcome these defects of the earlier proposed device, sufficiently to provide signals that can be satisfactorily utilized by an angle of attack indicator, a rocket or missile platform aiming computer, or the like.

Further, the invention aims to provide a sensor that can be utilized in a horizontal position to accurately sense deviations in angle of attack and can be utilized in a vertical position to accurately sense deviations in angle of side slip, to provide reliable signals from a pair of the sensors, for conjointly (along with a Mach number speed sensor) directing the operation of a gun aiming computer.

Other objects will become apparent in the ensuing specifications and appended drawing in which:

Fig. 1 is a sectional view on the main axis of a sensor embodying the invention;

Fig. 2 is a fragmentary front end view of the same, with a portion of the probe broken away and shown in section, as indicated by line 2—2 of Fig. 1;

Fig. 3 is a transverse sectional view on line 3—3 of Fig. 1;

Fig. 4 is a forwardly-looking transverse sectional view;

Fig. 5 is a detail sectional view through the casing in a vertical plane, with internal parts shown in side elevation;

Fig. 6 is a detail of the potentiometers, viewed from the rear; and

Fig. 7 is a fragmentary sectional view in a horizontal plane of the probe axis.

Fig. 8 is a view showing the sensor mounted on the fuselage of an aircraft.

*Description*

The angle of attack sensor of my invention utilizes a probe 6 which, in operation, is disposed in the slip stream of air across a point on the forward fuselage of the airplane (Fig. 8) so as to sense the direction of travel thereof. The sensor may for example be mounted on the fuselage F with the probe 6 projecting, parallel to the wing span axis (i. e. normally horizontal and transverse). Probe 6 is in the form of a tube having a closed outer end 7; having a partition 8 (Fig. 2) disposed on a diametric plane along its longitudinal axis and dividing it into equal symmetrical longitudinal passages extending its full length; and having a pair of slots 9, 9' of equal breadth and length piercing its side wall, extending parallel to the tube axis, and disposed symmetrically at equal distances on respective sides of one margin of partition 8 at equal acute angles to the plane of the partition, the angle being in the neighborhood of 45°. Probe 6 has two shoulders 10 on which are mounted anti-friction bearings 11 and 12, which in turn are mounted in respective ends of a cylindrical bearing housing 13. Part 10 has a coaxial stem 14 projecting from its rear end. The bore of probe tube 6 extends into shoulder 10 to a closed bottom therein, indicated at 15 in Fig. 1, and communicates with a transverse bore which is divided by the rear end of partition 8 (Fig. 3) into a pair of ports 16 each communicating with a respective one of the passages within probe 6. Probe 6 has an enlarged central portion 17 which is fitted within a cylindrical bore 18 in bearing housing 13 with sufficient snugness to have a valving action therein but sufficiently loose to be freely rotatable. Ports 16 are adapted to communicate at all times with wider ports 19, 19' in fitting 13.

Fitting 13 is mounted within a cylindrical bore 20 in a partition block 21. Block 21 has a base portion which is secured in a recess 22 in one side of a generally cylindrical housing 23, the opposite side of partition block 21 being of wedge shape, defined between faces 24, 24' which converge to an axis of intersection which coincides with the axis of a cylindrical inner wall 25 of housing 23. A shaft 26, coaxial with this axis, is mounted in bearings 27 and 28 in a front wall 29 and a removable back plate 30 respectively of housing 23 by means of reduced stems 31, 32 at its respective ends, the former engaging an end bearing 33 and the latter being engaged by an end bearing spring 34. Bearing 33 is in the form of a plug threaded into a central boss 29' in front wall 29. Bearing 34 is in the form of a leaf spring which bears with very light pressure against the pointed tip of stem 32, thus maintaining the pressure on shaft 26 to maintain a clearance relationship of paddles 35 and 35' and housing bore 25. Friction between these tips and end bearings, and friction in bearings 27 and 28 (which are of the jewel bearing type) is negligible.

Mounted in diametrically opposed grooves in a hub 26' on shaft 26, are paddles 35, 35', which divide the space within housing 23 into three chambers, namely, a chamber 36 between paddle 35 and one side of partition block 21; a chamber 36' between paddle 35' and the other side of partition block 21; and a dash-pot chamber 36", of 180° extent, opposed to chambers 36, 36'. Chambers 36, 36' are subjected to the air pressures transmitted through the passages connected respectively to slots 9 and 9' within probe 6, and through ports 16 and 19, 19' respectively. When a differential is developed between these pressures, paddles 35, 35' react to rotate shaft 26, which, through linkage 42, 43, 44, adjusts the angular position of probe 6, as will be explained more fully hereinafter.

Paddles 35, 35' completely divide the cylindrical space within housing 23 into two semi-cylindrical areas, one of which contains the partition block 21 and the other of which consists in the dash-pot chamber 36". These areas are pneumatically isolated from one another by paddles 35, 35', the ends of which are fitted closed to cylindrical wall 25 and the straight sides of which are fitted closely to the parallel inner faces of end wall 29 and cover plate 30, although in each instance with sufficient clearance to avoid frictional contact between the edges of the paddles and the housing walls. Partition block 21 completely separates the respective portions of the one semi-cylindrical area, so as to pneumatically isolate chambers 36, 36' from one another. At its rear end, block 21 may include, as an integral part thereof, a potentiometer case 21' which may be sealed to end plate 30 around the margins of aperture 14' therein, and to the rim of housing 23 as shown in Figs. 5, 6 and 7. The apex portion of block 21 has a quarter-cylindrical recess fitted to hub 26' to complete the pneumatic isolation of chambers 36, 36', but with slight clearance such as to avoid frictional contact.

Leaf spring 34 is secured, as indicated, to a mounting block 37 attached to the outer face of back plate 30. The parts 32, 34, 36 and 37 are enclosed between the back plate 30 and a cover 38 which is attached to back plate 30. An O ring seal 39 is provided around peripheral flange 39 and cover 38 to protect potentiometer 49 from the elements. Securing posts 40 in the form of long shank screws extend through the cover and are threaded into back plate 30. Back plate 30 in turn is attached to housing 23 by cap screws 41.

Also within cover 38 is a feedback linkage including a lever 42 mounted on stem 32; a lever 43 attached to the end of probe stem 14; and a connecting link 44 having bifurcated ends provided with bearings in which the ends of the levers 42 and 43 are respectively pivoted by pivots 45 and 46. Levers 42, 43 include weight arms 47, 48 projecting on the opposite sides of stems 32, 14.

Angular deviations of probe 6 from a neutral position are registered on one or more potentiometers, synchros, induction potentiometers or other position indicating devices which function to transmit electrical signals to other instruments (e. g. of a computer) which may utilize such signals for various purposes, such as visually indicating angle of attack, controlling armament-aiming actuators, etc. In Fig. 6, two potentiometers, one for varying the resistance in the circuit of a local angle of attack indicator, and the other for varying the resistance in a true angle of attack circuit of a computer system such as that disclosed in the application of Elmer M. Luther, Jr. for Angle of Attack Computer System, filed concurrently herewith, are shown at 49 and 49' in Fig. 6, disposed within the potentiometer case 21'. The potentiometers are not shown in other figures of the drawing.

Operation

In the operation of this improved sensor, the probe system will be at rest when the direction of airflow across the probe exactly subtends the angle between slots 9 and 9', and a zero differential pressure exists between chambers 36 and 36'. The potentiometer 49 is set so that it will transmit a reading to the local angle of attack indicator and the armament-aiming computer, such as to indicate the said proper local angle of attack and the true angle of attack for any selected cruising speed, when the probe and paddles are in their rest positions.

Referring again to Fig. 2, when the direction of the air flowing across the probe changes (as when the attitude of the aircraft changes), such change in direction of the airstream is indicated by the arrow 50. The pressure across the slot 9' of probe 6 will thereby be increased, and the pressure across slot 9 will be correspondingly decreased, thus setting up a differential in the pressure in chamber 36' over that in chamber 36 (i. e. increasing the pressure in chamber 36' while decreasing the pressure in chamber 36) in response to which paddles 35', 35 will adjust clockwise, as viewed in Fig. 3, rotating shaft 26. Through feedback linkage 42—48, this adjustment will be fed back to probe 6, adjusting the latter toward the new airstream direction 50 until the direction of airflow across the probe exactly subtends the angle between the slots 9 and 9' and a zero differential pressure exists between chambers 36 and 36'.

The resulting adjustment of potentiometer 49 will change the resistance in the circuit of the local angle of attack indicator so as to indicate the increased local angle of attack. The corresponding adjustment of potentiometer 49' may be utilized to change the resistance in the circuit of a true angle of attack computer which registers true angle of attack (angle between the aircraft datum line and the flight path of the aircraft).

The invention is particularly characterized by the arrangement of the two symmetrically opposed paddles 35, 35' so as to provide the dash-pot chamber 36'' of maximum volume within the limits set by the requirement for space for paddles 35, 35' to shift toward partition block 21 before being stopped by contact with faces 24, 24' thereof. This arrangement, coupled with weights 47, 48 effectively dampens out all tendency for the instrument to hunt, and results in a smooth adjustment to the position dictated by each new shift in angle of attack. The weights 47, 48, by inertia action, dampen rapid adjusting movements such as would tend to over-shoot the balance position. The body of air in compensating chamber 36'' gently resists all adjusting movements as follows: the frictional drag of this air body against housing wall 25, coupled with slight inertia in the air body, resists bodily shifting of the air body about the housing axis by the movement of paddles 35, 35'. However, the extremities of this air body will allow a quicker yielding of the paddles, due to the compressibility of the air, such initial yielding being attended by slight compression adjacent the advancing paddle 35' and slight rarification adjacent the retreating paddle 35, which provides a cushioning action pending the entire body of air being urged into movement. The resulting dampening action is quite effective in eliminating hunting or overshoot.

I claim:
1. An angle of attack sensor comprising: a main housing having a cylindrical peripheral wall; a paddle shaft journalled in said housing on the axis of said housing with which said wall is coaxial; a tubular probe having near one end a base portion journalled in said housing on an axis parallel to said housing axis, said probe projecting from the housing and having a pair of circumferentially spaced axially extending parallel slots in its lateral wall and a diametral partition dividing the angle subtended between said slots at the probe axis, said partition dividing the interior of the probe into two passages extending longitudinally from the respective slots into said base portion, and said base portion having in its respective sides, ports connected respectively to said passages; paddles secured to said paddle shaft and projecting radially from opposite sides thereof, said paddles being fitted to the inner walls of the housing in substantially pneumatic sealing relation thereto so as to provide a compensating chamber on one side of the paddles; a partition member associated with said base portion of the probe and traversing the area on the other side of the paddles so as to divide it into differential pressure chambers communicating respectively with said ports; and feedback linkage connecting said paddle shaft to said probe in a manner such that a pressure differential set up between said pressure chambers by a change in the direction of an air stream exerting pressure across said slots, will act upon the paddles to impart to the paddle shaft an increment of rotation that will be fed back to the probe so as to adjust the latter to a position such as to eliminate said pressure differential, said compensating chamber containing a body of air which by cushioning action against the paddles, coupled with resistance to bodily shifting about the housing axis, will exert a dampening effect upon the tendency of the moving parts to hunt or overshoot in seeking a new position when energized by a pressure differential; said probe having a stem at its rear end; and said feed-back linkage including substantially parallel lever arms attached to said paddle shaft and stem respectively and projecting both on one side of the common plane of their axes, inertia weights projecting from the respective lever arms on the other side of said plane, and a link pivoted to and connecting the ends of said lever arms.

2. A sensor as defined in claim 1, wherein said main housing has a back plate defining a rear wall of said differential pressure chambers and compensating chamber, said partition member being sealed to said back plate and to said paddle shaft; said stem and paddle shaft projecting through said back plate and said feed-back linkage being disposed rearwardly of said back plate and externally of said chambers; a leaf spring in end load bearing engagement with the rear end of said paddle shaft; a mounting block secured to the rear face of said back plate and carrying said leaf spring; and an adjustable stop comprising a set screw threaded through a portion of said mounting block and positioned to provide a stop for limiting movement of the lowermost lever arm of said linkage.

3. An angle of attack sensor comprising: a main housing having a cylindrical peripheral wall; a paddle shaft journalled in said housing on the axis of said housing with which said wall is coaxial; a tubular probe having near one end a base portion journalled in said housing on an axis parallel to said housing axis, said probe projecting from the housing and having a pair of circumferentially spaced axially extending parallel slots in its lateral wall and a diametral partition dividing the angle subtended between said slots at the probe axis, said partition dividing the interior of the probe into two passages extending longitudinally from the respective slots into said base portion, and said base portion having in its respective sides, ports connected respectively to said passages; paddles secured to said paddle shaft and projecting radially from opposite sides thereof, said paddles being fitted to the inner walls of the housing in substantially pneumatic sealing relation thereto so as to provide a compensating chamber on one side of the paddles; a partition member associated with said base portion of the probe and traversing the area on the other side of the paddles so as to divide it into differential pressure chambers communicating respectively with said ports; and feedback linkage connecting said paddle shaft to said probe in a manner such that a pressure differential set up between said pressure chambers by a change in the direction of an air stream exerting pressure across said slots, will act upon the paddles to impart to the paddle shaft an increment of rotation that will be fed back to the probe so as to adjust the latter to a position such as to eliminate said pressure differential, said compensating chamber containing a body of air which by cushioning action against the paddles, coupled with resistance to bodily shifting about the housing axis, will exert a dampening effect upon the tendency of the moving parts to hunt or overshoot in seeking a new position when energized by a pressure differential; said probe having a stem at its rear end; and said feed-back linkage including substantially parallel lever arms attached to said paddle shaft and stem respectively and projecting both on one side of the common plane of their axes, inertia weights projecting from the respective lever arms on the other side of said plane, and a link pivoted to and connecting the ends of said lever arms, said lever arms and link having their longitudinal axes arranged in rectangular array in the median position of the probe.

References Cited in the file of this patent

UNITED STATES PATENTS

| 1,332,810 | Danielson | Mar. 2, 1920 |
| 2,416,573 | Finch | Feb. 25, 1947 |
| 2,701,473 | Fieldgate | Feb. 8, 1955 |

FOREIGN PATENTS

| 582,847 | France | Oct. 22, 1924 |